Patented July 4, 1950

2,513,790

UNITED STATES PATENT OFFICE 2,513,790

MONO-HALOGEN-SUBSTITUTED-THIOPHANTHRAQUINONE

Louis Frederick Fieser, Belmont, Mass., and Herman Elbert Schroeder, Wilmington, Del., assignors to E. I. du Pont de Nemours & Company, Wilmington, Del., a corporation of Delaware No Drawing. Application November 24, 1948, Serial No. 61,914

6 Claims. (Cl. 260—329)

This invention relates to chemical compositions useful as valuable intermediates in organic synthesis, particularly in the synthesis of dyestuffs, and a new method for their manufacture. More particularly, this invention relates to a process of manufacturing pure monohalogen-thiophanthraquinone compounds and still more particularly to a process for manufacturing certain monohalogen-thiophanthraquinones hitherto not obtainable. The compounds to which this invention particularly relates are halogen-thiophanthraquinones of the formula:

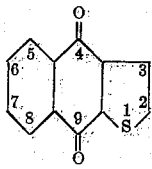

in which one of the positions 2, 3, 5, 6, 7, and 8 is substituted by a halogen atom consisting of bromine and chlorine atoms.

The term "thiophanthraquinone" is employed in the naming of these compounds in view of the original name used by Scholl and Seer; Ann. 394, 131 (1912), who called the corresponding hydrocarbon compound "thiophanthracene."

The object of this invention is to provide for a process of producing halogen-substituted-thiophanthraquinones in higher yield and purity than by any other known process. A further object is to prepare mono-halogen-substituted-thiophanthraquinones by a process which proceeds smoothly and without degradation of the thiophene nucleus. Another object is to provide for a process of producing substantially pure mono-halogen-thiophanthraquinones, which as final products contain little or no other isomeric compounds. A further object is to prepare certain mono-halogen-thiophanthraquinones which are not capable of isolation by any other known process. A still further object is to provide for the production of new compositions of matter, namely 5-halo-thiophanthraquinone and 7-halo-thiophanthraquinone.

As described in the copending application of Lee and Weinmayr United States Serial Number 723,673, certain thenoyl benzoic acids substituted in the benzene nucleus by halogen can be ring closed to form corresponding thiophanthraquinones:

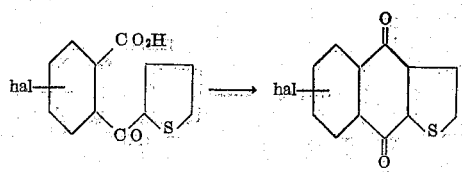

Various new halogenated thiophanthraquinones prepared in this manner, which had not previously been described in the literature, form valuable intermediates in organic synthesis and are of particular interest in the synthesis of dyestuffs. In such cases it is especially desirable that homogeneous preparations of specific known isomers be employed for the construction of various molecules which are contemplated.

Surprisingly it was found, however, that when one attempts to prepare 5-halo-thiophanthraquinone or 7-halo-thiophanthraquinone by ring closing the corresponding halogenated thenoyl benzoic acids, due to the influence of reagents causing ring closure, rearrangements occur with the result that 5-halo-thiophanthraquinone and 7-halo-thiophanthraquinone are not isolable from the final product or capable of identification.

When one attempts to prepare 6-halo-thiophanthraquinone and 8-halo-thiophanthraquinone by ring closing the corresponding halo-thenoyl-benzoic acids, rearrangements occur to a somewhat lesser extent but none the less final products of highest purity are not obtained but contain isomeric compounds which are separated only with great difficulty.

Mixtures of isomers are obviously less desirable than the pure materials for the synthesis of various dyestuff structures and there is therefore a great need for a method which will afford the isomers desired in a high state of purity suitable for further use.

We have now found a method of providing pure thiophanthraquinone and its halogenated derivatives, in particular those which by ordinary methods of ring-closure are inaccessible, which comprises reduction of a 2-(2-thenoyl)-benzoic acid to a 2-(2-thenyl)-benzoic acid, ring-closure of 2-(2-thenyl)-benzoic acid to a 4-acetoxy-thiophanthrene and oxidation of the 4-acetoxythiophanthrene to form the thiophanthraquinone in high yield and in a pure condition.

Our method makes accessible for the first time pure 5- and 7-halogenated thiophanthraquinones, each particularly valuable intermediates for dyestuff syntheses. Furthermore, it is generally applicable to the synthesis of halogen-thiophanthraquinone derivatives in high yield and is of particular utility in cases where more orthodox methods of preparation afford low yields with undesirable by-products. Since the thenoylbenzoic acid ring-closure cannot be relied upon for high yield of pure products, this new method offers the only route to certain desirable materials. While it is surprising that the ring closure of the thenylbenzoic acids to acetoxythiophanthrenes proceeds so smoothly and without rearrangement, it is more noteworthy that the acetoxythiophanthrenes can be oxidized in such high yields to the thiophanthraquinones apparently without appreciable degradation of the thiophene nucleus.

The nature of our invention is more clearly demonstrated by the following examples. Parts are by weight unless otherwise specified.

Example 1

A charge of 20 parts of 6-chloro-2-(2-thenoyl)-benzoic acid, 900 parts of 28% aqueous ammonia, 0.5 part of copper-sulfate crystals, and 50 parts of zinc dust was heated to the boil for 36 hours. During this period of heating 45 parts of 28% ammonia was added every six hours until a total of 270 parts of ammonia was used. The zinc dust was removed by filtration. The filtrate was acidified, and the precipitate was filtered at room temperature. Nineteen (19) parts of 6-chloro-2-(2-thenyl)-benzoic acid, melting point 113°–114° C., were obtained.

A solution of 19 parts of 6-chloro-2-(2-thenyl)-benzoic acid and 1.5 parts of freshly fused zinc chloride in 114 parts of acetic acid and 76 parts of acetic anhydride was refluxed for 90 minutes, and then while still hot, carefully diluted to about double its volume with water. Upon filtration 15 parts of 4-acetoxy-5-chloro-thiophanthrene, melting point 80°–85° C., was obtained. After a crystallization from methanol it melted at 87°–88° C.

One part of 4-acetoxy-5-chloro-thiophanthrene was dissolved in 20 parts of glacial acetic acid and oxidized by adding 0.1 part of chromic acid anhydride at room temperature, heating the solution to 80° C. and adding again 0.9 part of chromic acid anhyride. The charge was then refluxed five minutes, diluted with 4.5 parts of 36% hydrochloric acid and refluxed one minute longer. After water had been added to the hot solution until a precipitate began to form, the solution was cooled and filtered. The 5-chloro-thiophanthraquinone (0.665 part) was purified by vatting it in alkaline sodium hydrosulfite (yellow vat), and precipitating from the filtered solution with air. It was crystallized from acetic acid, and then from methanol and melted at 171.5°–172.5° C. Analysis indicates that this material is a mono-chloro-thiophanthraquinone different in melting point from any of the pure mono-chloro-thiophanthraquinones described in copending application Serial Number 723,673, which shows a pure product melting at 224° C. and no lower melting isomer. A mixture with the product of Example 2 (the 8-isomer—melting point 224° C.) shows little depression but melts over a wide range. This is undoubtedly the first preparation of substantially pure 5-chloro-thiophanthraquinone,

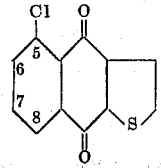

which has not been described previously. It should be noted that this material cannot be separated in a pure form from the 8-isomer by the usual fractional crystallization procedures.

Example 2

A charge of 20 parts of 3-chloro-2-(2-thenoyl)-benzoic acid, 900 parts of 28% aqueous ammonia, 0.5 part of copper-sulfate crystals, and 50 parts of zinc dust was heated at the boil for 36 hours, with 45 parts of 28% ammonia added every six hours. The charge was then clarified with adsorbent carbon (Nuchar), filtered, and the colorless filtrate was acidified while still hot. Upon cooling and filtration, 18 parts of 3-chloro-2-(2-thenyl)-benzoic acid, melting point 109°–112° C., was obtained.

A solution of 16 parts of 3-chloro-2-(2-thenyl)-benzoic acid and 1.6 parts freshly fused zinc chloride in 96 parts of acetic acid and 64 parts of acetic anhydride was refluxed for 90 minutes and then carefully diluted while still hot to about double the volume with water. The precipitate was filtered at room temperature and dried. 4-acetoxy-8-chloro-thiophanthrene (15 parts, melting point 178°–180° C.) was obtained. After crystallization from methanol, it melted at 187°–188° C.

The oxidation of one part of 4-acetoxy-8-chloro-thiophanthrene was carried out as described in the preceding example. 8-chloro-thiophanthraquinone (0.665 part) was obtained, which melted at 223.5°–224.5° C. after a crystallization from acetic acid and from methanol and appeared identical with the product obtainable from ring-closure of the 3- or 6-chloro-thenoyl-benzoic acids after the latter had been exhaustively purified.

Example 3

A charge of 4.5 parts of 5-chloro-2-(2-thenoyl)-benzoic acid, 200 parts of 28% aqueous ammonia, 0.12 part of copper sulfate crystals, and 11.3 parts of zinc dust was heated to the boil. Eleven (11) parts of 28% ammonia was added six times in six-hour intervals, while slight refluxing was maintained. One part of adsorbent carbon (Nuchar) was then added, and the charge was filtered and acidified with acetic acid while still hot. Upon cooling 3.92 parts of 5-chloro-2-(2-thenyl)-benzoic acid was obtained (92% of theory), melting point 133° C. The product was purified by dissolving it in 300 parts of dilute ammonia and precipitating it again by adding acetic acid to the boiling solution. Upon cooling pure 5-chloro-2-(2-thenyl)-benzoic acid was obtained as long, white, felted needles, melting point 134° C.

A charge of 3.3 parts of 5-chloro-2-(2-thenyl-benzoic acid, 20 parts of glacial acetic acid, 14 parts of acetic anhydride, and 0.4 part of freshly fused zinc chloride was refluxed for 90 minutes. Water was added carefully to the charge until heavy crystallization set in. Upon cooling, 2.8 parts of 4-acetoxy-6-chloro-thiophanthrene, melting point of 146°–147° C., were obtained (77.8% of theory). After two crystallizations from 60 parts of ethanol each time it was obtained with the constant melting point of 154°–155° C.

Five and two tenths (5.2) parts of 4-acetoxy-6-chloro-thiophanthrene were dissolved in 110 parts of glacial acetic acid. About one-half part of chromic acid anhydride was added and the charge was heated to 80° where 4.5 parts of chromic acid anhydride were added at once. After refluxing for a few minutes, 30 parts of concentrated hydrochloric acid were carefully added, and boiling was continued a few minutes longer. Two hundred and fifty (250) parts of water were then added, and the crystalline precipitate was filtered at room temperature. The filter cake was washed acid-free and dissolved in 700 parts of water of 60° C., containing 12 parts of sodium hydroxide and 15 parts of sodium hydrosulfite. The filtered solution was blown with air until all of the 6-chloro-thiophanthraquinone had been precipitated. Thus 3.6 parts of 6-chloro-thiophanthraquinone (77.0% yield), melting point of 182° C. were obtained. Upon crystallization from 250 parts of high boiling gasoline, and again from 100 parts of chlorobenzene it was obtained as yellow crystals with the constant melting point of 189°–190° C. This appears identical with the product from ring-closure of the 4-(or 5)-chloro-2-(2-thenoyl)-benzoic acids.

*Example 4*

A charge of 2.64 parts of 4-chloro-2-(2-thenoyl)-benzoic acid, 120 parts of 28% aqueous ammonia, 0.07 part of copper-sulfate crystals, and 7 parts of zinc dust was heated to the boil. Seven (7) parts of 28% ammonia were added to the mixture at six-hour intervals while refluxing was continued. The ammoniacal solution was filtered and acidified with acetic acid while still hot. The crystalline precipitate was filtered at room temperature, and purified by dissolving it in hot dilute ammonia and again precipitating it with acetic acid. 4-chloro-2-(2-thenyl)-benzoic acid, melting point of 155° C., was obtained (2.22 parts, 88.8% yield) in the form of short, coarse needles. A mixed melting point with 5-chloro-2-(2-thenyl)-benzoic acid showed a strong depression.

One and twenty-five hundreds (1.25) parts of 4-acetoxy-7-chloro-thiophanthrene were added to 30 parts of glacial acetic acid and oxidized with 1.25 parts of chromic acid as described in the preceding example. The crude 7-chloro-thiophanthraquinone was purified by vatting it in 100 parts of water containing four parts of sodium hydroxide and five parts of sodium hydrosulfite. 7-chloro-thiophanthraquinone (0.75 part, 67% yield, melting point 208° C.) was obtained. After crystallizations from high boiling gasoline, pure 7-chloro-thiophanthraquinone melted at 213°–214° C. A mixture of the 7-chloro-thiophanthraquinone and the 6-chloro-thiophanthraquinone of the preceding example melted from 180° to 198° C. This product is therefore the new and previously undescribed 7-chloro-thiophanthraquinone and is an isomer which apparently cannot be obtained by ring-closure of the chloro-thenoylbenzoic acids; nor can it be separated in pure form by fractional crystallization of a mixture with the 6-isomer.

In the above examples one may in each instance replace the starting material, chloro-2-(2-thenoyl)-benzoic acid, with bromo-2-(2-thenoyl)-benzoic acid and thus prepare 5, 6, 7, or 8 bromo-thiophanthraquinone with the same advantageous results of purity of compound. One may also use the above-described process to prepare a thiophanthraquinone substituted in the 2 or 3 position by bromine or chlorine by choosing as a starting material a 2-(2-thenoyl)-benzoic acid which contains a chlorine or bromine constituent in the 4 or 5 position of the thiophene ring. The results obtained here also give the desirable purity of products.

The thenylbenzoic acids employed in this invention are prepared by reduction of the corresponding thenoyl derivatives by usual methods, of which the zinc-ammonia reduction is particularly effective. Ring-closure of the anthranyl acetates is best accomplished in an organic acid medium, e. g., acetic acid, using at least one mole equivalent of anhydride such as acetic anhydride and an acidic catalyst such as anhydrous zinc chloride to effect the desired reaction which may be represented as:

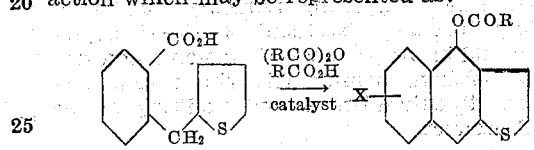

Oxidation is very conveniently effected with such common agents as chromic acid or sodium dichromate, preferably in an acid medium. The oxidation may also be accomplished by suspending the anthranyl acetate in aqueous or alcoholic alkali and oxidizing with air or with sodium hypochlorite, but the yields under these conditions are not as high.

As can be seen from the above description our invention affords a very convenient method for preparing the pure thiophanthraquinone substituted in 2, 3, 5, 6, 7, or 8 positions by bromine and chlorine. It offers the only known method for preparing isolable 5- and 7-halogenated thiophanthraquinones. To summarize we have discovered a process for preparing pure mono-bromo and mono-chloro-thiophanthraquinones which because of the unsymmetrical nature of their chemical structure, if prepared by any other known method of synthesis contain inseparable isomers in which case they would not be as desirable as the pure compounds for use as dye intermediates.

We claim:

1. The method for preparing pure halogen-substituted-thiophanthraquinone of the formula:

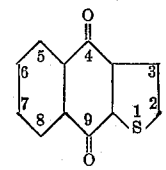

wherein one of the positions 2, 3, 5, 6, 7, and 8 is substituted by a halogen of the group consisting of bromine and chlorine, which comprises reducing the corresponding mono-halogen-substituted 2-(2-thenoyl)-benzoic acid to a 2-(2-thenyl)-benzoic acid, ring closing to a 4-acetoxy-thiophanthrene, and oxidizing to the desired product.

2. The method for preparing a pure mono-halogen-substituted-thiophanthraquinone of the formula:

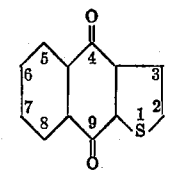

wherein one of the positions 2, 3, 5, 6, 7, and 8 is substituted by a halogen of the group consisting of bromine and chlorine, comprising reducing the corresponding halogen-substituted 2-(2-thenoyl)-benzoic acid in the presence of ammonia and zinc to a 2-(2-thenyl)-benzoic acid, ring closing to a 4-acetoxy-thiophanthrene, and oxidizing to the desired product.

3. The method of preparing a mono-halo-thiophanthraquinone of the formula:

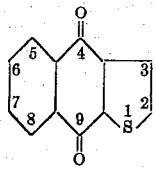

wherein one of the positions 5 and 7 is substituted by a halogen of the group consisting of bromine and chlorine, comprising reducing the corresponding halogen-substituted 2 - (2 - thenoyl)-benzoic acid in the presence of ammonia and zinc to a 2-(2-thenyl)-benzoic acid, ring closing to a 4-acetoxy-thiophanthrene, and oxidizing to the desired product.

4. A mono-halogen-substituted-thiophanthraquinone of the formula:

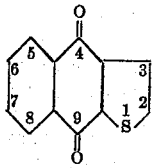

in which one of the positions 5 and 7 is substituted by a halogen of the group consisting of chlorine and bromine.

5. 5-chloro-thiophanthraquinone.
6. 7-chloro-thiophanthraquinone.

LOUIS FREDERICK FIESER.
HERMAN ELBERT SCHROEDER.

REFERENCES CITED

The following references are of record in the file of this patent:

Thomas, "Anhydrous Aluminum Chloride," pages 540, 544 and 547, Reinhold Pub. Co., 1941.

Bernthsen and Sudborough, "Organic Chemistry," Van Nostrand, N. Y., 1925 (1922 edition), page 549.